Oct. 7, 1952        C. H. BRASELTON        2,612,990
CARTRIDGE LIPSTICK

Filed Jan. 7, 1948                                      3 Sheets-Sheet 1

*INVENTOR.*

Chester H. Braselton

Oct. 7, 1952     C. H. BRASELTON     2,612,990
CARTRIDGE LIPSTICK

Filed Jan. 7, 1948     3 Sheets-Sheet 2

INVENTOR.
Chester H. Braselton

Oct. 7, 1952     C. H. BRASELTON     2,612,990
CARTRIDGE LIPSTICK

Filed Jan. 7, 1948     3 Sheets-Sheet 3

INVENTOR.

Chester H. Braselton

Patented Oct. 7, 1952

2,612,990

UNITED STATES PATENT OFFICE 2,612,990

CARTRIDGE LIPSTICK

Chester H. Braselton, New York, N. Y.

Application January 7, 1948, Serial No. 835

10 Claims. (Cl. 206—56)

This invention relates generally to lipsticks of the type described in my copending applications, Serial No. 699,025, filed September 24, 1946, entitled "Lipsticks," now Patent No. 2,457,342; Serial No. 699,026, filed September 24, 1946, entitled "Retractable Lipstick," now Patent No. 2,565,346; Serial No. 751,035, filed May 28, 1947, entitled "Non-Retractable Lipstick"; Serial No. 755,607, filed June 19, 1947, entitled "Manual Feeding Lipstick," now abandoned; Serial No. 756,598, filed June 24, 1947, entitled "Manual Feeding Retractable Lipstick," and Serial No. 782,536, filed October 28, 1947, entitled "Lipstick," now Patent No. 2,545,444. The construction of these referenced lipsticks generally embodies the use of a protective lipstick cartridge which surrounds a body of lipstick matter, and is further shaped at the working end of the lipstick cartridge to provide an improved applicatory surface for the lipstick material. Also embodied in this form of lipstick is a feeding mechanism housed within the cartridge container disposed to feed lipstick material toward the working end of the cartridge as the rouge material is consumed. This feeding action is activated by rotational drive of the non-working end closure of the lipstick cartridge with respect to the cartridge wall. Means are also provided for driving the rotatable closure of the lipstick cartridge with respect to the lipstick cartridge by interengagement of the closure with some member of the lipstick casing to which the lipstick cartridge may be detachably fastened, so that when the cartridge is in place within the lipstick casing, rotation of the lipstick cartridge with respect to the lipstick casing will effect extrusion of lipstick matter from the working end of the lipstick cartridge.

It is an object of this invention to provide improved driving means whereby the feeding means within the lipstick cartridge may be activated by rotation of the lipstick cartridge with respect to the lipstick casing.

It is also an object of this invention to provide means whereby the feeding means and the cartridge are detachably held so that the feeding mechanism is in detachable driving relationship with the lipstick case enclosing the cartridge.

It is further an object of this invention to provide an arrangement of mechanical elements which will permit smoother and more positive action in the detachable engagement of a lipstick cartridge with the cooperating receiving driving element of the lipstick casing housing the lipstick cartridge.

Figure 1:
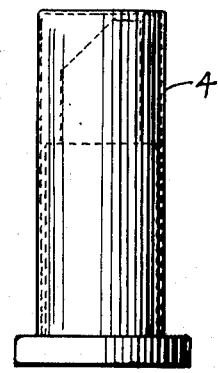
Fig. 1 is an elevational view of a lipstick with its removable protective cap in place thereon.
Figure 2:
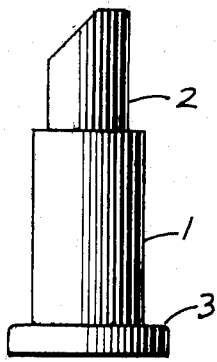
Fig. 2 is a similar elevational view of the lipstick casing shown in Fig. 1, with the protective removable cap removed.

The lipstick shown in Figs. 1 and 2, Fig. 1 showing the lipstick with its protective cap in place, and Fig. 2 showing the same with the protective cap removed, is one of many types of lipstick in which my invention may be readily embodied. The lipstick in Figs. 1 and 2 comprises a lipstick cartridge housing element 1, having detachably placed within it a lipstick cartridge 2, of a type described in the above cited applications. The outside surface of the housing 1, in cooperation with the hub 3, which is fixed in relationship to the housing 1, is adapted to receive protective cap 4 for the entire lipstick when the lipstick is not in use. The design, construction, operation and advantages of the particular type of lipstick or cartridge, such as depicted by the element 2, has been thoroughly described in detail, also, in my previously cited applications, and will not be considered at too great a length at this time.

Figure 3:
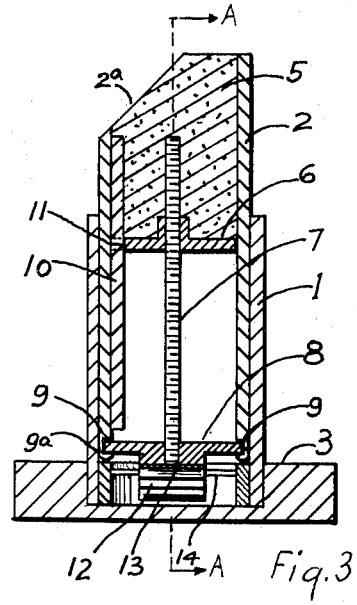
Fig. 3 is a longitudinal sectional view of a lipstick as shown in Fig. 2, but showing the cartridge driving element in elevation.
Figure 4:
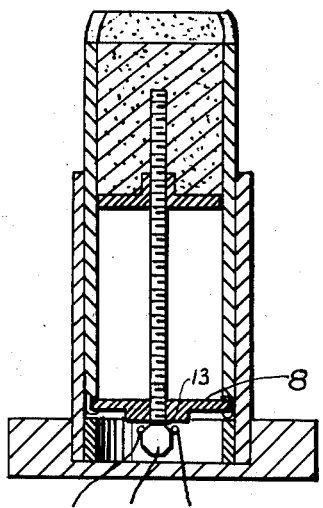
Fig. 4 is a longitudinal sectional view of the lipstick as shown in Fig. 3, taken on the line A—A, and looking in the direction of the arrows thereon, but showing the cartridge driving element in elevation.

It will be seen, however, with reference to Figs. 3 and 4, that the lipstick cartridge 2 is adapted to contain lipstick material 5, such that this lipstick material may be pushed toward the working surface 2a of the lipstick cartridge 2 by action of the feeding piston 6. The feeding piston 6 receives its axial drive through the rotation of driving rod 7 on which the piston 6 is threadedly engaged. The driving rod 7 is, in turn, fixedly attached to the rotatable closure 8 of the cartridge 2, the closure 8 being restrained from upward axial motion by the recess or counterbore 9 in the lower or non-working end of the cartridge. The cartridge material 9a on the underside of the lipstick cartridge is lightly spun over the outer surface of the rotatable closure 8 so as to allow the rotatable closure 8 freedom of rotation, but aiding in restraining its downward axial motion. The feeding piston 6 is seen to be in engagement with spline 10 fastened to the inner wall of the lipstick cartridge 2 by means of notch 11 in the periphery of the feeding piston 6. This engagement permits axial, longitudinal movement of the piston 6 within the cartridge 2, however, at the same time restraining rotation of the piston 6 with respect to the cartridge 2. It is thus seen that any rotation of the rotatable closure 8 with respect to the lipstick cartridge 2 will result in rotation of the driving rod 7, with respect to the lipstick cartridge, and hence rotation with respect to the feeding piston 6 threadedly engaged upon the driving rod 7. This rotation of the rod 7, with respect to the piston, will then provide feeding action of the lipstick material 5 toward the working surface 2a of the lipstick cartridge 2 by axial movement of the feeding piston 6 within the lipstick cartridge. In order for the rotatable closure 8 to be rotated with respect to the cartridge 2 while the cartridge 2 is being housed by the housing 1, it is necessary that the detachable linkage between the cartridge 2 and the housing 1 be such as to restrain rotation of the closure 8 with respect to the housing 1. This requirement of the detachable linkage between the cartridge and the housing will then permit feeding of the lipstick material 5 toward the working surface of the lipstick cartridge 2 by rotation of the lipstick cartridge 2 with respect to the housing element 1 when the lipstick cartridge is in place therein. This may be accomplished most expeditiously by establishing a driving relationship between an element of housing 1 and the rotatable closure 8 of the lipstick cartridge when the cartridge is being retained by the housing 1.

Figure 5:
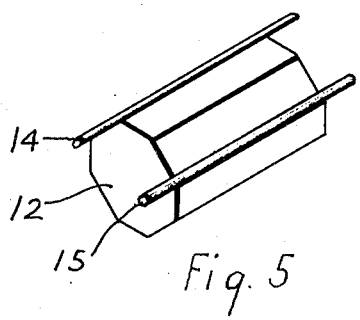
Fig. 5 is an elevational view depicting the action of three cooperating elements in my invention.

In the particular embodiment of my invention shown in Figs. 3 and 4 I have shown an octagonal rod 12 to be fastened by solder or other suitable adhesive, 13, to the lower outer surface of the rotatable closure 8. Fixation of this octagonal rod to the rotatable closure 8 is shown in more detail by Figs. 6 and 7. The length of octagonal rod 12 is established so that it is appreciably greater than the distance across the flats of the rod. This constructional feature allows the cooperation of this rod with two smaller diameter rods to establish rotational restraint of the octagonal rod when engaged between the two smaller diameter restraining rods. The arrangement of these restraining rods, such as 14 and 15 in Figs. 3 and 4, to snappingly engage the octagonal rod 12, is amenable to many useful variations. In every case, however, the parallel restraining rods 14 and 15 are separated by a distance less than the flats diameter of an octagonal rod with further provision such that they may be separated in excess of their normal separation against spring action to a distance at least equal to the flats diameter of the octagonal rod. Thus in Figs. 3 and 4, and more particularly in Fig. 5, it may be seen that the restraining rods 14 and 15, when provided with spring action opposing further separation of the rods than their resting separational distance, which is less than flats diameter of the octagonal rod, will permit a snap-acting engagement of the octagonal rod 12 between the restraining rods 14 and 15. The method for supporting and supplying a spring action between restraining rods 14 and 15 will be disclosed hereinafter.

Figure 6:
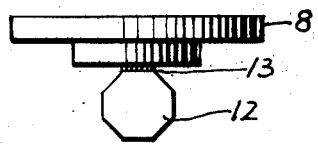
Fig. 6 is an end elevational view of the rotatable driving closure of the lipstick cartridge, being adapted to one form of my invention.
Figure 7:
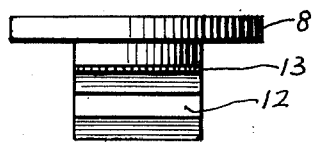
Fig. 7 is an elevational 90° side view of the embodiment shown in Fig. 6.
Figure 8:
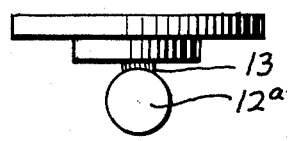
Fig. 8 is an elevational end view of another arrangement of elements used in an embodiment of my invention.
Figure 9:
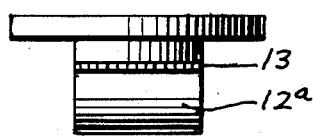
Fig. 9 is an elevational 90° side view of the embodiment shown in Fig. 8.

Figs. 8 and 9 show an arrangement practically identical to that shown in Figs. 6 and 7, except that a circular rod 12a has been substituted for the octagonal rod 12. In every other respect the construction is identical, as well as its action in cooperation with the restraining rods 14 and 15.

Figure 10:
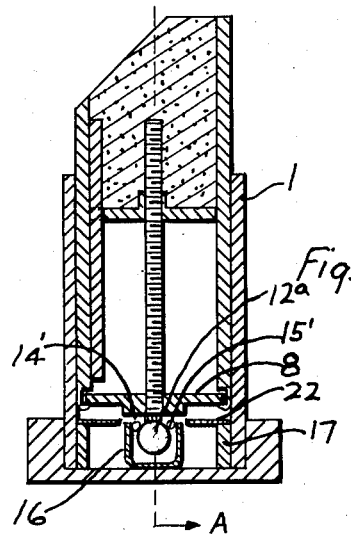
Fig. 10 is a longitudinal sectional view of a lipstick of the type shown in Fig. 2, incorporating another embodiment of my invention, but showing the cartridge driving element in elevation.
Figure 11:
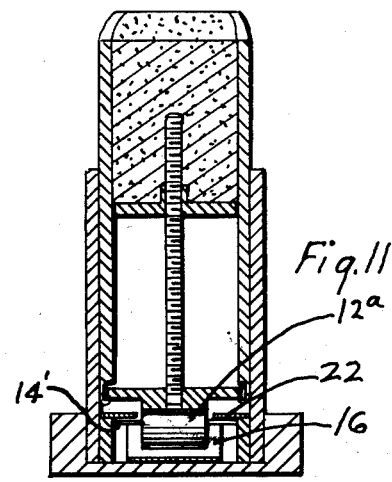
Fig. 11 is a longitudinal sectional view of the lipstick as shown in Fig. 10, taken on the line A—A and looking in the direction of the arrows thereon, but showing the cartridge driving element in elevation.
Figure 12:
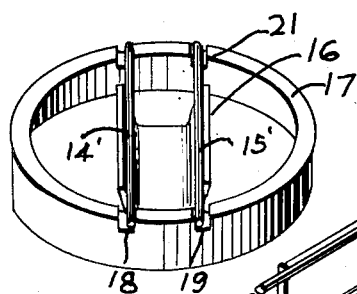
Fig. 12 is an elevational view, to a larger scale, of an assembly used in the embodiment of my invention, as illustrated in Figs. 10 and 11.

In Figs. 10 and 11 is shown the use of circular rod 12a as an element of linkage when attached to the closure 8' in another embodiment of my invention. The circular rod cooperates with the restraining rods 14' and 15' exactly as described with reference to the octagonal rod, the springing action between the restraining rods 14' and 15' being achieved by U-shaped spring 16, shown in more detail in Fig. 13. The restraining rods 14' and 15' are mounted in a circular supporting ring 17, which, in turn, is fixedly attached to the inside surface of the lipstick housing 1, in Fig. 10 or Fig. 11 by solder or other means. Before the circular supporting ring 17 is fixed within the lipstick housing 1 as shown in Figs. 10 and 11, the restraining rods 14' and 15' are placed in supporting slots 18, 19, 20 and 21 of the circular supporting ring 17. The U-shaped spring 16 is then assembled from the under side of the restraining rods so as to hold them together at a separation determined by the distance between the slots 18 and 19 and slots 20 and 21 with a springing action. The slots 18, 19, 20 and 21 are of dimensions which allow considerable movement of the restraining rods 14' and 15', while being supported by the same so that should the octagonal or circular rod 12 or 12a, respectively, associated with a rotatable closure 8 or 8', be pushed between the two restraining rods, the spring 16 would yield and allow the restraining rods to pass over the maximum diameter of the rod until such maximum diameter had passed contact with the restraining rods, at which time the rods would then be forced toward the original position separation by the action of the spring 16, and thus axially and rotationally detachably restrain motion of the rod with respect to the circular ring. A cover 22 in Fig. 14 for the supporting ring 17 is provided, having a circular opening 23 of a diameter larger than the length of the engaging rod 12 or 12a. This cover 22 is placed on top of the assembly shown in Fig. 12 to prevent axial motion of the spring 16 within the ring 17, as well as to provide upward restraint for the ends of the restraining rods 14 and 15 in the supporting slots.

Other arrangements for achieving the springing action between two restraining rods or to provide the equivalent action of two restraining rods, such as 14 and 15, are shown in Figs. 15 through 20, Fig. 15 illustrating the arrangement where only one restraining rod is used and is of such material and dimension as to yield sufficiently within itself when fastened in the supporting ring 17a. In such a case the restraining rod 24 is fastened by solder or other means in a supporting hole 25, located in the periphery of the supporting ring 17a. The other end of the restraining rod 24 is supported by an enlarged or elongated hole 26 which provides considerable clearance for the restraining rod. This particular arrangement is more economical of construction but does not provide as smooth an action as two restraining rods. In this case the engaging octagonal or circular rod fastened to the rotatable closure is acted upon only on one side by this restraining rod 24, which is mounted to assume a normally displaced position from a diameter of the ring 17a.

Figure 15:
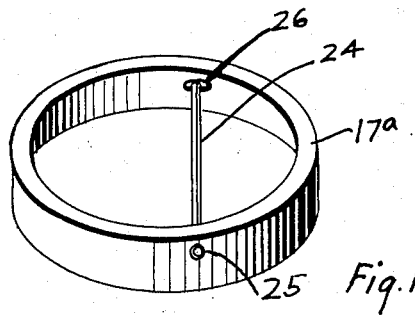
Fig. 15 is an elevational view of a retaining assembly employing only one retaining rod as used in my invention.
Figure 16:
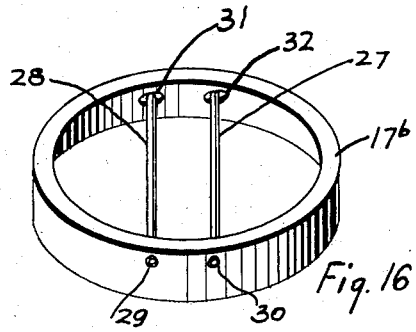
Fig. 16 is an elevational view of a retaining assembly similar to that shown in Fig. 15, however employing two restraining rods.

Fig. 16 is merely an amplification of the mounting method illustrated in Fig. 15. Here two parallel restraining rods 27 and 28 are soldered or otherwise fastened within the holes 29 and 30 of substantially the same diameter as the rods, while the other ends of the rods 27 and 28 are free to move within the enlarged elongated holes 31 and 32 of the supporting ring 17b. Again the spring action of material from which the restraining rods is made is depended upon for snap-acting engagement of the octagonal or circular rod.

Figure 17:
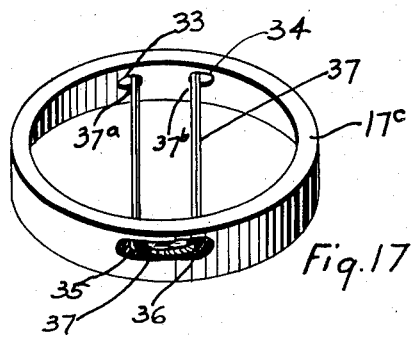
Fig. 17 is an elevational view of a retaining assembly for use in my invention which employs a U-shaped spring in lieu of the two separate retaining rods.
Figure 18:
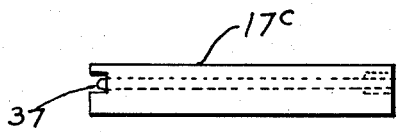
Fig. 18 is an elevational side view of the retaining assembly shown in Fig. 17.

In Fig. 17 supporting ring 17c is adapted with two elongated holes 33 and 34, and two other supporting holes 35 and 36, having a circular diameter large enough to freely admit a U-shaped wire spring 37. The periphery of the ring 17c is slotted at the holes 35 and 36 to allow the base of the U-shaped wire spring 37 to be inserted in the holes without protruding beyond the diameter of the ring 17c. This slot feature is shown more particularly in Fig. 18, which is a side elevational view of the ring 17c. The U-shaped spring 37 is held in place within the holes 33, 34, 35 and 36 with the action of the surrounding inner walls of the lipstick housing when the ring 17c is in place, as shown in connection with ring 17 in Figs. 10 and 11, no solder or adhesive necessarily being used in this particular embodiment to fasten the spring in the ring. Again the inherent spring of the material making up the U-shaped spring 37 provides the necessary spring acting restraint in the separation of the two shanks of the U-shaped spring when forced into displacement by the maximum diameter of the octagonal or circular engaging rod of the rotatable closure.

Figure 19:
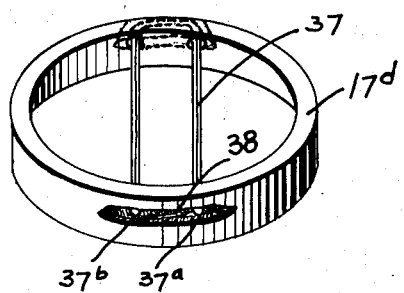
Fig. 19 is an elevational view of a modification of the retaining assembly shown in Fig. 17.

This U-shaped spring 37 may be embodied in another form of supporting ring 17d, as shown in Fig. 19. The annular ring 17d is substantially the same as the ring 17c illustrated in Fig. 17. However, instead of having the two movable ends 37a and 37b of the U-shaped spring 37 supported by elongated holes such as 33 and 34 in Fig. 17, these yielding ends are supported in a slot such as 38 in Fig. 19. The advantage of this particular method of construction lies in the fact that the open or through slot 38 may be milled or ground from the outer periphery of the annular ring 17d in a single mechanical operation. The base of the U of the U-shaped spring 37 is again seated in a slot such as 35 in Fig. 17. This particular construction is not shown in the view of Fig. 19 but is intended to be identical to that shown in Fig. 17.

Figure 20:
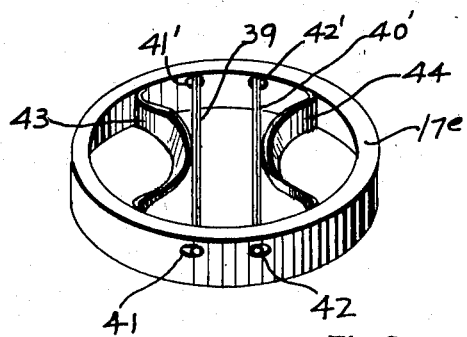
Fig. 20 is an elevational view of a retaining assembly useful in the embodiment of my invention employing separate spring means for the retaining rods.
Figure 21:
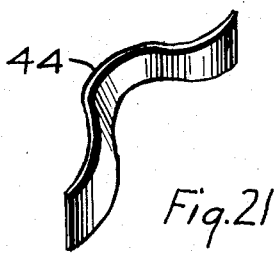
Fig. 21 is an elevational view of a spring useful in the retaining assembly shown in Fig. 20.

The embodiment shown in Fig. 20 comprises two separate restraining rods 39 and 40 mounted in elongated mounting holes 41, 41' and 42 and 42', respectively, located in the periphery of the annular supporting rings 17d. The action of these restraining rods 39 and 40, in cooperation with an octagonal or circular rod fastened to the rotatable closure of the lipstick cartridge, is the same as has been described hereinbefore; in this arrangement, however, the spring action tending to establish minimum separation between the two restraining rods 39 and 40 is accomplished by the thin crescent-shaped springs 43 and 44 which are situated as shown in Fig. 20. The crescent-shaped springs such as 44 being shown in separate elevational view in Fig. 21, may assume a variety of operating shapes, the crescent-shaped form shown herein being only representative of a simple and economical form of spring construction. These springs have a width which is not thicker than the thickness of the supporting ring 17e and may be held in place by merit of their spring action. A decorative plate such as that shown in Fig. 14 may be fastened to the outer edge of the annular ring 17e to further aid in keeping the springs in position if so desired.

In general terms, moreover, it will be appreciated that the wires or rods 14, 15 and their counterparts, in the present disclosure constitute laterally acting detent means carried by the casing base, and that the substantially rigid element 12, and its counterparts, carried by the cartridge feed screw, being narrower above their mid-heights than at their mid-heights, are thus laterally undercut for retentive engagement by the laterally resilient detent means.

Figures 13, 14:
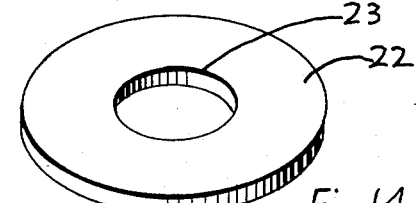
Fig. 13 is an elevational view showing in more detail the relation between elements of the assembly in Fig. 12.
Fig. 14 is an elevational view of a protective cover for the assembly shown in Fig. 12.

It is to be understood that in the foregoing description where I have shown a snugly fitting supporting hole for a restraining rod or a linkage, or loosely fitting supporting hole for said restraining rods located in the supporting ring, that these holes may be substituted by transverse slots of proper width with restraint toward the open end of the slots being imposed by a washer or cover such as that shown in Fig. 14. It is also apparent from the description of the embodiments of my invention that the supporting ring such as 17 hereinbefore described may be completely eliminated by supplying the mounting holes for the restraining rod surfaces in the lower portion of the lipstick casing housing 1. The present disclosure, however, finds ready application to lipstick cases already fabricated in which it is desirable to include the additional feature of driving detachability of the lipstick cartridge from the lipstick casing.

Other advantageous applications of the methods and forms of the invention described herein will automatically suggest themselves to those skilled in the art to which this invention relates, without, however, departing from the following claims.

What I claim is:

1. A cosmetic applicator of the cartridge type comprising a casing, a cartridge enterable into the casing, said cartridge having a paste feeding means therein including a portion rotatably fixed in the bottom of the cartridge, undercut drive-connecting means for said paste feeding means projecting from said rotatable portion, and spring means carried by said casing in position to be flexed to admit said connecting means therepast and to spring back into the undercut portion thereof to retain said cartridge in said casing.

2. A cosmetic applicator of the cartridge type comprising a casing, a cartridge enterable into the casing, said cartridge having a paste feeding means therein including a portion rotatably fixed in the bottom of the cartridge, a laterally elongated undercut drive-connecting means for said paste feeding means projecting from said rotatable portion, and laterally elongated spring means carried by said casing in position to be flexed to admit said connecting means therepast in one position thereof and to spring back into the undercut portion thereof to retain said cartridge in said casing.

3. A cosmetic applicator according to claim 2, in which said laterally elongated undercut drive connecting means comprises a transversely extending rod of polygonal cross section.

4. A cosmetic applicator according to claim 2 in which said laterally elongated undercut drive connecting means comprises a transversely extending rod of generally cylindrical cross section.

5. A cosmetic applicator casing for receiving and base-securing a cosmetic cartridge element having a cartridge sleeve, paste feeding means therein, and at the base thereof a rotatably fixed, rigid, feed driving and cartridge retaining element; said casing comprising a base member having an outwardly projecting cartridge-receiving sleeve, and having within said sleeve a resilient snap-fastener element complementary to and formed to retainingly engage the rigid retaining element at the base of such cartridge for maintaining a driving connection between the casing base and the paste feeding means of the cartridge.

6. A cosmetic applicator casing according to claim 5 for a cartridge having an undercut cartridge carried retaining element, in which said resilient snap fastener element comprises at least one wire-like spring element carried by and extending transversely across said casing sleeve in position to be displaced by said rigid cartridge carried retaining element and to snap back into the undercut portion thereof to base-retain the cartridge in the casing when the cartridge base is pushed into the cartridge receiving sleeve of the casing base.

7. A cosmetic applicator casing according to claim 6 in which the wire-like spring element is of relatively small diameter and in which the casing further comprises a resilient backing-up means for said wire-like spring element positioned to urge the latter toward cartridge retaining position with materially augmented tension.

8. A cosmetic applicator cartridge adapted for base securement in a cosmetic casing having laterally resilient securing means therein; said cartridge comprising a paste embracing sleeve having a base end, paste feeding means therein including a portion rotatably fixed in the base end of the sleeve, said rotatable portion carrying a substantially rigid laterally undercut driving element projecting below the base end of the sleeve in position for retentive engagement by the laterally resilient securing means of the casing by which the cartridge sleeve may be secured against longitudinal movement relative to the casing.

9. A cosmetic applicator cartridge according to claim 8 in which said undercut driving element comprises a transversely extending polygonal rod wider at its mid-section than at its juncture with said rotatable portion.

10. A cosmetic applicator according to claim 8 in which said undercut driving element comprises a transversely extending generally cylindrical rod wider at its mid-height than at its juncture with said rotatable portion.

CHESTER H. BRASELTON.

REFERENCES CITED

The following references are of record in the file of this patent:

UNITED STATES PATENTS

| Number | Name | Date |
|---|---|---|
| 1,451,941 | Clum | Apr. 17, 1923 |
| 1,999,263 | Thesmar | Apr. 30, 1935 |

FOREIGN PATENTS

| Number | Country | Date |
|---|---|---|
| 526,348 | Great Britain | Sept. 17, 1940 |